United States Patent [19]
Braun et al.

[11] Patent Number: 5,077,966
[45] Date of Patent: Jan. 7, 1992

[54] CHAIN JOINT FOR ROUND-LINK CHAIN, PARTICULARLY CUTTING CHAIN

[75] Inventors: Gert Braun; Ernst Braun, both of Essen-Heisingen, Fed. Rep. of Germany

[73] Assignee: Halbach & Braun Industrieanlagen, Wuppertal, Fed. Rep. of Germany

[21] Appl. No.: 595,097

[22] Filed: Oct. 10, 1990

[30] Foreign Application Priority Data

Oct. 11, 1989 [DE] Fed. Rep. of Germany ....... 3933939

[51] Int. Cl.⁵ ............................................. F16G 15/04
[52] U.S. Cl. .......................................... 59/86; 474/218
[58] Field of Search ........................ 59/78, 84, 85, 86; 474/218, 222

[56] References Cited

U.S. PATENT DOCUMENTS 2,259,217 10/1941 Stevenson ................................. 59/86
2,435,336 2/1948 Belvel ...................................... 59/86
2,709,616 5/1955 Larson et al. ............................ 59/86
4,079,584 3/1978 Shahan .................................... 59/86

FOREIGN PATENT DOCUMENTS 1161490 9/1958 France .................................... 59/86
294343 7/1928 United Kingdom .................... 59/86

Primary Examiner—David Jones
Attorney, Agent, or Firm—Toren, McGeady & Associates

[57] ABSTRACT

A chain joint for round-link chain, particularly cutting chain, includes chain link arc members and chain link side members connecting the chain link arc members. Bearing members are provided on one side of the chain link arc members. The bearing members have threaded bores and a threaded bolt can be screwed into the threaded bores to form one of the chain link side members. The chain joint is without tension and meets the requirements of a true chain link and can be integrated into the dimensions of a round link chain.

5 Claims, 1 Drawing Sheet

CHAIN JOINT FOR ROUND-LINK CHAIN, PARTICULARLY CUTTING CHAIN

BACKGROUND OF THE INVENTION

1. Field of the Invention

The present invention relates to a chain joint for a round-link chain, particularly cutting chain, with chain link arc members and chain link side members which connect the chain link arc members.

2. Description of the Related Art

A chain joint with chain-like dimensions for round-link chains is known in the art. This known chain joint has two equal chain joint parts which engage each other in a tooth-like manner in the region of the chain link side members and are supported by a web with recesses. This chain joint is disclosed in DD-PS 118 315. A chain joint of this type is relatively complicated to manufacture.

Also known in the art is a shackle which is used as an essentially temporary connection of round-link chains. Such a shackle includes essentially a U-shaped connecting member whose legs have bores for a locking bolt. The locking bolt may be a threaded bolt with a screw head and a thread at the other end. One of the bores of this shackle is a threaded bore.

Shackles of this type are disadvantageous for the following reasons. The thread on only one side prevents a tension-free closing of the shackle. Rather, the two legs of the U-shaped connecting member are tensioned toward each other already during the closing procedure so that fatigue failures of the connecting member which is under permanent stress may occur. In addition, shackles of this type cannot be integrated as chain links in a round-link chain. Rather, they exceed the cross-sectional size of the chain and form a body of non-conforming dimensions. This is particularly true when considering the fact that the connected chain links surround the U-shaped portion of the connecting member, on the one hand, and the locking bolt, on the other. Consequently, the round-link chains connected to a shackle cannot be used, for example, as cutting chains.

As is well known, a cutting chain is a round-link chain which is engaged by the driven chain wheel of a cutting machine, wherein the horizontal and vertical chain links of the cutting chain or round-link chain are arranged in a guide rail section with engagement groove for the chain wheel and the individual chain links alternatingly assume a horizontal position and a vertical position.

SUMMARY OF THE INVENTION

It is, therefore, the primary object of the present invention to provide a chain joint for a round-link chain, particularly cutting chain, of the above-described type which is of simple and useful construction and has a long service life, and which can particularly be integrated as a true chain link into the dimensions of a round-link chain.

In accordance with the present invention, a chain joint of the above-described type has bearing members at the two chain link arc members on the side of one of the chain link side members, wherein the bearing members extend at an angle relative to the longitudinal axis of the chain links, wherein the bearing members have threaded bores extending parallel to the longitudinal axis of the chain links, the threads of each threaded bore being directed in the same direction, and wherein a threaded bolt is screwed into the threaded bores, so that the threaded bolt forms one of the two chain link side members.

The features of the invention provide the result that the connected chain links do not engage the threaded bolt which acts as a locking bolt, but engage the chain link arc members as this is the case in a true chain link. Thus, the threaded bolt forms only one of the two chain link side members. In addition, the threaded bolt can be screwed into the two threaded bores without creating tension, so that a tension-free chain joint is created. It is significant in this connection that, as in a true chain link side member, the threaded bolt ensures a defined spacing between the bearing members and of the chain link arc members through the bearing members, and that the dimensions of the chain link are not exceeded. Consequently, the chain joint according to the present invention is also suitable for connecting round-link chains which are used as cutting chains.

The threaded bolt can be locked in different ways. For example, locking can be effected by the occurring loads or tension acting on the chain joint. Thus, the chain joint according to the present invention is a simple, useful and narrow or compact chain joint which can be integrated into the chain dimensions of the round-link chain and which has a long service life.

In accordance with a preferred feature of the invention, the bearing members extend at a right angle to the longitudinal axis of the chain links and the bearing members have the same cross-sectional size as the chain link side member which is integrally connected to the chain link arc members, so that the chain joint does not exceed the dimensions of the chain links to be connected.

In accordance with another feature, the chain link arc members may have between the bearing members and the oppositely located chain link side member a reduced cross-sectional size, so that the chain joint is properly engaged by the chain links to be connected in the areas of the chain link arc members.

In accordance with a proposal of the invention of independent significance, the threaded bolt is an extension bolt with threaded heads at the end of the bolt, wherein the heads have threads which are directed in the same direction and whose cross-sectional size exceeds that of the bolt cross-section. As a result, the threaded bolt acts as a true chain link side member and the two threaded connections are essentially free of stress.

Another feature of the present invention provides that hexagonal recesses are provided in the end faces of the threaded heads, so that screwing of the threaded bolt into and out of the bearing members is facilitated.

Finally, the invention provides that the distances of the center axes of the chain link side member and the threaded bolt from the longitudinal axis of the chain links are equal, so that a symmetrical arrangement is ensured of the chain link arc members and of the one chain link side member with the threaded bolt as the other chain link side member. This feature also provides the result that the chain joint according to the invention is integrated in the dimensions of the round-link chain.

The various features of novelty which characterize the invention are pointed out with particularity in the claims annexed to and forming a part of this disclosure. For a better understanding of the invention, its operating advantages and specific objects attained by its use, reference should be had to the drawing and descriptive

DESCRIPTION OF THE PREFERRED EMBODIMENT

Figure 1:
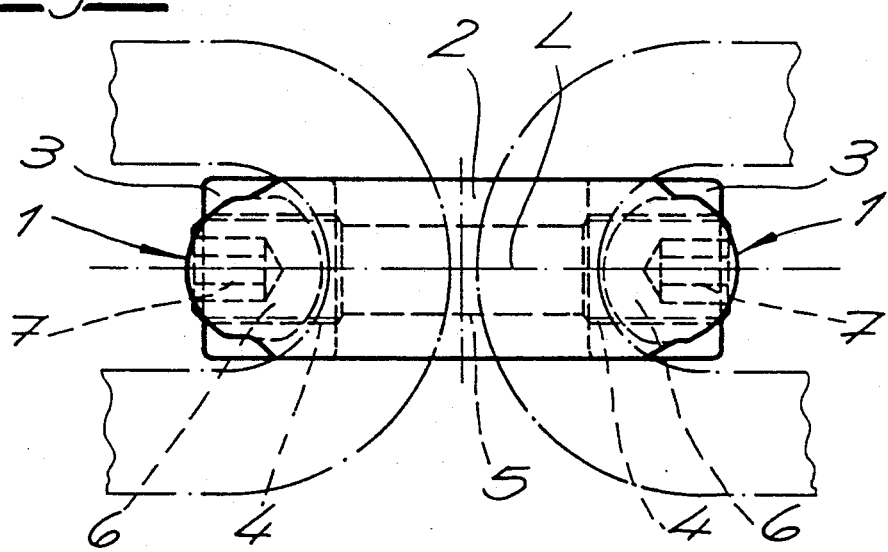
FIG. 1 is a top view of a chain joint according to the present invention, with chain links partially illustrated in dash-dot lines.
Figure 2:
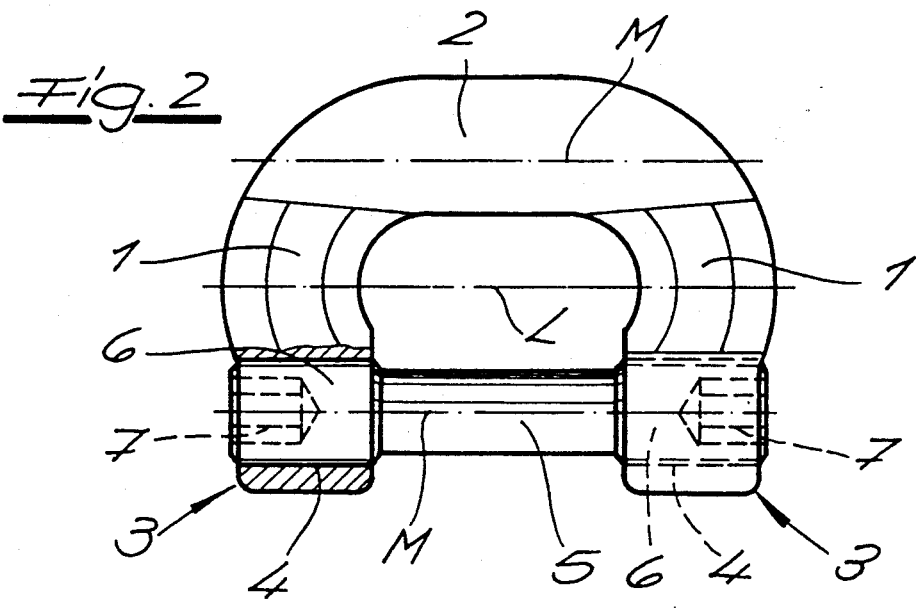
FIG. 2 is side view of the chain joint of FIG. 1, with one chain link side member shown in section.
Figure 3:
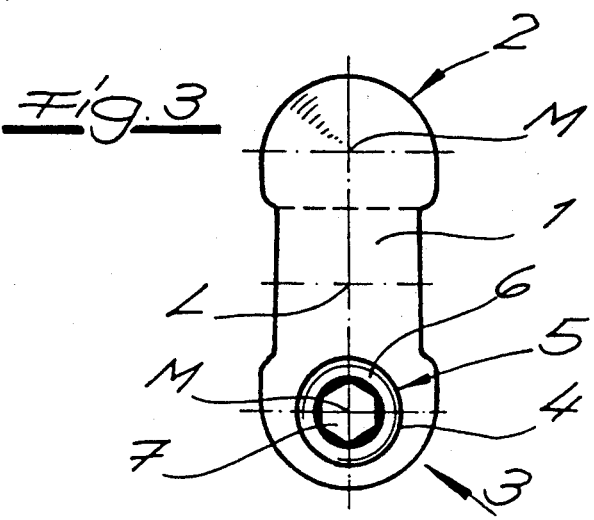
FIG. 3 is a side view of the chain joint of FIG. 1.

The figures of the drawing show a chain joint for a round-link chain, particularly cutting chain, with chain link arc members 1 and chain link side members 2 which connect the two chain link arc members 1. The two chain link arc members 1 have on one side bearing members 3 which extend at an angle relative to the longitudinal axis L of the chain links. The bearing members 3 have threaded bores 4 which extend parallel to the longitudinal axis L of the chain links. The threads of the bores 4 are directed in the same direction.

A threaded bolt 5 is screwed into the threaded bores 4. This threaded bolt 5 forms one of the chain link side members.

The bearing members 3 extend at a right angle relative to the longitudinal axis L of the chain links and have the same cross-sectional size as the chain link side member 2 which is integrally connected to the chain link arc members 1. The chain link arc members 1 may have a reduced cross-sectional size between the bearing member 3 and the oppositely located chain link side member 2.

The threaded bolt 5 is an expansion bolt with threaded heads 6 at the ends thereof, wherein the threads are directed in the same direction and the cross-sectional size of the heads exceeds that of the bolt. The end faces of the threaded heads 6 have hexagonal recesses 7. The distances of the center axes M of chain link side member 2 and threaded bolt 5 from the longitudinal axis L of the chain links are equal.

While a specific embodiment of the invention has been shown and described in detail to illustrate the application of the inventive principle, it will be understood that the invention may be embodied otherwise without departing from such principles.

We claim:

1. A chain joint for a cutting chain, comprising two chain link arc members and first and second chain link side members connecting the two chain link arc members, the two chain link arc members having first ends connected to the first chain link side member, the two chain link arc member having second ends at the second chain link side member, the second ends each having a bearing member which extends at an angle relative to a longitudinal axis of the chain links, the bearing member defining threaded bores which extend parallel to the longitudinal axis of the chain links, the threads of the bores being directed in the same direction, a threaded bolt being screwed into the threaded bores, the threaded bolt forming the second chain link side member, wherein the threaded bolt is an expansion bolt having ends, the expansion bolt having threaded heads at the ends, the threaded heads having a cross-sectional size which exceeds the cross-sectional size of the bolt between the threaded heads.

2. The chain joint according to claim 1, wherein the bearing members extend at a right angle to the longitudinal axis of the chain links, and wherein the bearing members have the same cross-sectional size as the first chain link side member.

3. The chain joint according to claim 1, wherein the chain link arc members have a reduced cross-sectional size between the bearing members and the first chain link side member.

4. The chain joint according to claim 1 wherein the threaded heads have end faces, wherein at least the end face of one of the threaded heads has a hexagonal recess.

5. The chain joint according to claim 1, wherein the distances of center axes of the first and second chain link side members from the longitudinal axis of the chain links are equal.

* * * * *